May 10, 1960  E. E. SHIPLEY  2,935,869
TORQUE APPLYING AND MEASURING DEVICE
Filed July 16, 1957
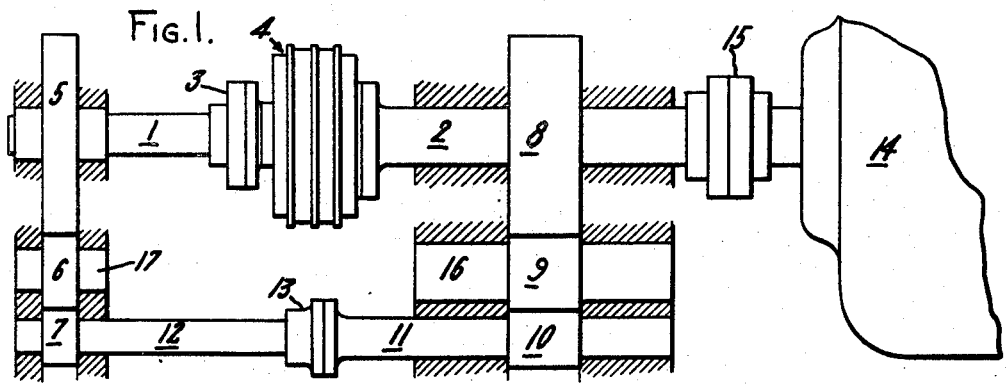
Fig. 1.
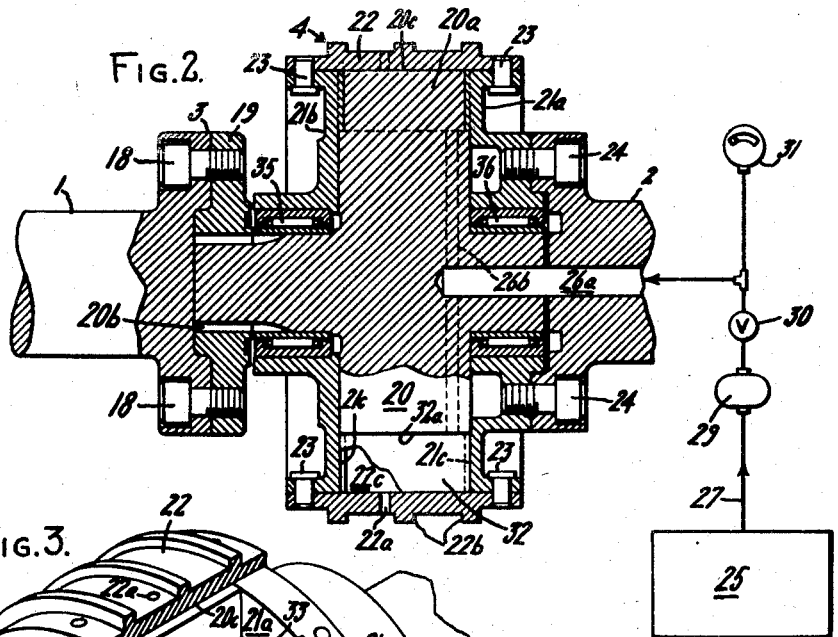
Fig. 2.
Fig. 3.
INVENTOR.
EUGENE E. SHIPLEY
BY
HIS ATTORNEY ём
United States Patent Office 2,935,869
Patented May 10, 1960

2,935,869

TORQUE APPLYING AND MEASURING DEVICE

Eugene E. Shipley, Middleton, Mass., assignor to General Electric Company, a corporation of New York Application July 16, 1957, Serial No. 672,297

4 Claims. (Cl. 73—136)

This invention relates to torque applying and measuring devices, and more particularly to a torque applier for loading gears during test operations.

The torque applier to which the present invention relates provides a simple improved method of applying torque to a rotating apparatus, as may be used to facilitate testing under load of gears or like mechanism. It has previously been the practice to apply torque to such mechanism by means of torque wrenches which, of course, must be done when the machine is shut down. This method of applying torque is unsatisfactory in that apparatus tested in this manner must be started up with full load from zero speed. Many designs will not stand this sort of punishment, and there are usually few applications where this type of loading takes place in actual service. A previous torque applier effective to apply torque while the system was in motion was disclosed in U.S. Patent 2,371,607 issued to L. J. Collins, and assigned to the assignee of the present invention. While effective, this arrangement was found to be not readily adaptable to apparatus of small torque ratings.

Accordingly, it is an object of this invention to provide an improved device for applying a predetermined torque or phase displacement between two connected rotating members.

A further object is to provide a device of the type described in which the torque may be readily applied or varied during normal operation without stopping, and may be accurately measured to ascertain the load being applied to the gears or like mechanism being tested.

Another object is to provide a torque-applying device which may be effectively employed as a hydraulic torque-meter in power-transmission equipment.

A still further object is to provide torque-applying and measuring mechanism of the type described which is simple to operate, and rugged and easy to maintain.

Other objects and advantages will become apparent from the following description taken in connection with the accompanying drawings, in which—

Fig. 1 is a diagrammatic illustration of the torque applying device applied to apparatus for testing a "locked" gear train;

Fig. 2 is a cross sectional view through the axis of the torque applying device; and Fig. 3 is a perspective view, partially in section, of the torque applying mechanism.

Generally stated, the invention relates to a torque-applying and measuring mechanism, for testing gears or the like. The mechanism consists of associated rotatable members defining a chamber into which fluid under pressure is supplied to displace relative to each other the members and the shafts on which the rotatable members are mounted. The shaft displacement is proportional to the torque transmitted; and thus, by controlling the pressure in the chambers, the torque in the system can be varied, and the pressure employed as a measure of the torque.

Referring to Fig. 1, the device comprises driven and drive shafts 1, 2, respectively which are interconnected through coupling 3 and my novel torque applying device 4. Secured to shaft 1 is gear 5 which engages idler gear 6 located on idler shaft 17. Gear 6 in turn engages gear 7 located on shaft 12 which is rigidly connected to shaft 11 by coupling 13. Mounted on shaft 11 is gear 10 which rotates gear 8 on shaft 2 through idler 9 on idler shaft 16. Thus, an interconnected gear set, or "locked train," is formed, so that when a torque is applied by my novel torque applying device, each of the gears in the set is loaded and testing of the gear teeth can be accomplished. The interconnected gear box arrangement is in turn driven by motor 14 which is connected to shaft 2 through coupling 15.

Referring now more particularly to Figs. 2 and 3, which illustrate in detail the novel torquing device, the torque applier 4 is shown connected to driven shaft 1 by coupling 3 which includes plate 19 bolted to shaft 1 by bolts 18. Plate 19 is secured to rotor 20 by spline 20b. This design permits insertion of anti-friction needle bearing 35 between the driving and driven members on the left-hand side thereof. A similar needle bearing 36 is similarly provided on the right-hand side between the driving and driven members. As illustrated in Fig. 3, the torque applying device further consists of a rotor 20 secured to shaft 1 through coupling 3. Rotor 20 has circumferentially spaced radially and axially extending "paddle members" 20a. Surrounding rotor 20 and secured to drive shaft 2 by bolts 24 is a housing consisting of axially spaced end plates 21a, 21b and drum member 22 secured to plates 21a, 21b by pins 23. Drum member 22 may be ribbed at 22b to further strengthen it against the forces applied thereto. Plates 21a, 21b and drum 22 form an annular chamber 22c in which the paddles 20a are rotatably disposed. The outer end surface of paddles 20a is spaced from the inner circumference of drum 22 to define a clearance space 20c, permitting a film of lubricant to exist between rotor 20 and drum 22. This clearance is sufficiently small to prevent excessive leakage.

Located in radial grooves 21c cut into the walls of end plates 21a, 21b are radially extending key members 32. Keys 32 are slidably disposed in the grooves 21c and their radial dimension is the same as that of paddles 20a. The keys 32 are not tightly fitted in grooves 21c but are free to move radially outward due to centrifugal force to contact the inner surface of drum 22 and prevent the leakage of fluid therebetween. The outward movement of key 32 tends to form a small radial clearance space 32a between the inner edge of keys 32 and rotor 20, which is just sufficient to admit a lubricant film of desired thickness therebetween to insure proper lubrication. This clearance space may be on the order of .0004" in a machine where the drum 22 is on the order of 9" diameter. Thus friction is reduced between the rotor 20 and keys 32 without excessive leakage. With this arrangement, the sliding keys 32 are readily machined with the accuracy required to insure adequate sealing between rotor 20 and drum 22, and for low cost manufacture of these parts of the torque applier assembly.

The diameter of the assembly can be made very small (i.e. on the order of 10 inches) and this feature combined with its symmetrical construction gives good dynamic balance, for reliable operation at high speed.

The sliding keys 32 and paddles 20a define therebetween alternately disposed circumferentially spaced chambers 33 for receiving fluid under pressure from an outside source. As shown, by way of example, only, the exterior system for supplying fluid under pressure to chambers 33 consists of a pump 29 that pumps fluid from a reservoir 25 to chamber 33 through conduit 27 and passages 26a, 26b, formed in rotor 20. The pressure of the fluid supplied to chambers 33 is regulated by valve 30 and indicated on gage 31. The fluid under pressure in the chambers 33 tends to cause relative rotion between the paddles 20a and keys 32, which in turn creates a rotational phase displacement of the shaft 1 relative to shaft 2, thereby applying a torque to the locked gear train 5, 6, 7, 8, 9, 10. After all lost motion has been removed, this displacement is proportional to the applied torque; and thus, by controlling the oil pressure from pump 29 by valve 30, the torque loading applied to the gears can be varied readily, during operation.

It remains to note that formed between alternately disposed circumferentially spaced chambers 33 are chambers 34 which are drained through openings 22a in drum 22. Thus, any fluid that leaks into chambers 34 through the leakage paths 20c, 32a formed between paddles 20a and drum 22, and keys 32 and rotor 20, respectively, is pumped out of housing 22 by centrifugal force and returned to a sump (not shown). Thus, no back pressure will be set up in chamber 34 by fluid collecting in the drain chambers 34 to oppose the forces existing in chambers 33.

The invention operates as follows.

Oil under pressure is supplied to chambers 33 through conduits 26a, 26b by pump 29. The pressure built up in chambers 33 acts on paddles 20a and keys 32 to move the rotor 20 and drum 22 in opposite directions to create a rotational phase displacement between shafts 1, 2 which is proportional to torque. This torque is proportional to the oil pressure in chamber 33; and thus, by varying the pressure, the torque can be controlled. The application of a torque to shafts 1, 2 loads the engaged teeth of the locked gear train 5, 6, 7, 8, 9, 10. That is, gear 8 which is loaded in one direction by the torque applied to shaft 2 is prevented from rotating by gear 5, which is loaded in the other direction by the torque applied to shaft 1, through gears 9, 10, rigidly connected shafts 11, 12 and gears 7, 6. Since at standstill only the engaged teeth are loaded, motor 14 is provided to rotate the preloaded gear set to facilitate testing of all the gear teeth. The pressure in chamber 33 can be changed either during operation or at a standstill, to change the loading on the gear teeth, thus eliminating "shutdown time" and permitting a closer approximation of actual gear loading conditions.

It is to be noted that when this testing assembly is driven by motor 14, centrifugal force acting on the fluid in chambers 33 increases the torque and thus the loading on the gears in the gear set. This additional torque can be readily calculated and added to the torque resulting from the static pressure of the fluid in chambers 33 to ascertain the true total loading on the gears. The lubricant paths 32a, 20c prevent the rotor and drum member from binding to permit accurate calculation of the loading applied to the gear teeth. The torque resulting from the static fluid pressure in chambers 33 is proportional to the pressure of the oil, as regulated by valve 30 and indicated on gage 31.

While the invention has been illustrated as applied to an arrangement for imposing torque on a locked gear train, it will be apparent that the "torque applier" 4 may be inserted in any power transmission train and used as a hydraulic torque-meter to measure the torque or power transmitted.

Thus it can be seen that the invention consists of a torque applying and measuring device, for testing gear teeth and like purposes, which can be easily constructed, is of low cost, and is simple to operate and maintain. Also, due to its relatively small size, it can be made to have good dynamic balance, very reliable operation at high speeds, and permits testing of gear teeth under variable load conditions.

It will be obvious to those skilled in the art that numerous changes and substitutions of equivalents might be made in the torque applying device disclosed herein. It is of course, desired to cover by the appended claims all such modifications as fall within the true spirit and scope of the invention.

What I claim as new and desire to secure by Letters Patent of the United States is:

1. A torque measuring and applying device comprising a first shaft, a second shaft axially aligned with the first shaft, interconnecting means between the first and second shafts opposing relative rotational displacement, and a torque applied for applying an internal torque to the first and second shafts beyond that which would normally be present in the shafts, the torque applier including a first rotor member secured to the first shaft and defining a plurality of radial and axially extending paddle members, a cylindrical housing member secured to the second shaft and defining an annular chamber into which the paddle members on the rotor extend, the cylindrical housing consisting of axially spaced walls and an annular member secured to the walls, the inner surfaces of the axially spaced walls defining radial slots, axially extending radially disposed key means located in said slots and forming with the paddle members a plurality of fluid pressure chambers, said key means having a radial distance slightly less than the radial distance from the rotor to the inner periphery of the cylindrical housing whereby a clearance space is formed between the key means and the rotor to prevent binding, a source of operating fluid under pressure, means for supplying fluid from said source to alternate chambers formed between the key means and paddle members on the rotor to cause a relative displacement between the first and second shafts which imposes an internal torque in the first and second shafts through said interconnecting means, and means for draining the chambers adjacent the chambers containing fluid under pressure whereby a fluid back pressure is not built up to prevent the application of torque to the first and second shafts.

2. In a mechanism for testing gears comprising a first rigid shaft means having first and second gear means at its first and second ends, a second shaft having a third gear means at one end in engagement with said first gear means, and a third shaft axially aligned with the second shaft and having a fourth gear means at one end in engagement with the second gear means, the combination of a device for applying a torque to the second and third shafts including a rotor member secured at one end to the second shaft and defining at least one radial and axially extending paddle member, a cylindrical casing including axially spaced radial end walls disposed on either side of and forming close axial clearances with said rotor paddle member, said casing also being secured to the third shaft and defining with the rotor an annular chamber, the cylindrical casing having at least one axially extending paddle member extending radially toward said rotor which defines a fluid pressure chamber with the paddle member on said rotor, said rotor and casing paddle members being free to undergo substantial circumferential displacement relative to one another, whereby lost motion may be removed from the interconnected gear means so as to produce an internal torque which is proportional to relative circumferential displacement of the paddle members, means rotatably supporting the rotor relative to the housing, a supply of operating fluid under pressure, means for conducting fluid from said source to said fluid pressure chamber to impose a torque on said second and third shafts to load the gear means for testing purposes, and means for rotating one of said shafts whereby all the gear teeth of the various gear means may be tested.

3. A mechanism for testing gears comprising a first rigid shaft means having first and second gear means at its first and second ends, a second shaft having a third gear means at one end in engagement with said first gear means, and a third shaft axially aligned with second shaft having a fourth gear means at one end in engagement with the second gear means, the combination of a device for applying a torque to the second and third shafts including a rotor member secured at one end to the second shaft and its other end defining a plurality of radial and axially extending paddle members, a cylindrical casing secured to the third shaft and defining with said rotor an annular chamber into which the paddle members extend, the cylindrical casing consisting of axially spaced end plates and a drum member secured thereto, the end plates defining radially extending slots in its inner surfaces, key means loosely fitted in said slots and extending inwardly towards said rotor to define a plurality of chambers between the key means and the paddle members, the key means and rotor defining a clearance space therebetween whereby lubricant may be provided between the key means and rotor to prevent binding, means rotatably supporting the rotor relative to the cylindrical housing, a source of operating fluid under pressure, means for conducting fluid to alternate chambers to impose a torque on said second and third shafts to load the gear means for testing purposes, means for draining the chambers between those supplied by fluid under pressure whereby a back pressure will not be set up to prevent the torque from being imposed on the second and third shafts, and means for rotating one of said shafts whereby all the gear teeth of the various gear means may be loaded and the key means moved outwardly by centrifugal force to prevent the leakage of fluid between the key and housing while permitting lubrication between the key and rotor to prevent binding therebetween.

4. In mechanism for measuring torque or power transmitted between axially aligned first and second shafts, the combination of a first rotor member secured to the first shaft and defining a plurality of circumferentially spaced radially disposed axially extending paddle members, a cylindrical housing member secured to the second shaft and defining with said rotor an annular chamber into which the paddle members extend and define small clearance spaces with the housing, the cylindrical housing comprising axially spaced end plates and a drum member secured thereto, the end plates defining radially extending slots in their inner surfaces, key means slidably disposed in said slots and defining a plurality of substantially closed fluid pressure chambers between said key means and paddle members, the key means defining close clearance spaces with the rotor and drum member, first passage means for conducting fluid under pressure to alternate ones of said fluid pressure chambers, second passage means for draining the remaining fluid pressure chambers interposed between the chambers supplied with pressure fluid by said first passage means whereby any fluid leaking past the paddle members and key means is drained through said second passage means without building up a counter-pressure opposing the force exerted on said key means and paddle members by the fluid supplied through said first passage means.

References Cited in the file of this patent
UNITED STATES PATENTS

| 2,322,182 | Walker | June 15, 1943 |
| 2,371,607 | Collins | Mar. 20, 1945 |
| 2,398,167 | Walker | Apr. 9, 1946 |
| 2,715,834 | Chamberlin | Aug. 23, 1955 |
| 2,827,785 | Robinson | Mar. 25, 1958 |

FOREIGN PATENTS

| 9,210 | Great Britain | 1910 |
| 697,586 | Germany | Oct. 17, 1940 |